(12) United States Patent
Ho et al.

(10) Patent No.: US 11,349,335 B2
(45) Date of Patent: May 31, 2022

(54) POWER SUPPLYING DEVICE

(71) Applicant: CYBER POWER SYSTEMS, INC., Taipei (TW)

(72) Inventors: Lien-Hsun Ho, Taipei (TW); Shou-Ting Yeh, Taipei (TW); Jui-Hung Chou, Taipei (TW); Kai-Tsung Yang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 219 days.

(21) Appl. No.: 16/693,744

(22) Filed: Nov. 25, 2019

(65) Prior Publication Data

US 2021/0159723 A1 May 27, 2021

(51) Int. Cl.
*H02J 9/00* (2006.01)
*H02J 9/06* (2006.01)
*H02J 7/02* (2016.01)

(52) U.S. Cl.
CPC .............. *H02J 9/062* (2013.01); *H02J 7/022* (2013.01); *H02J 2207/20* (2020.01)

(58) Field of Classification Search
CPC ........ H02J 9/062; H02J 7/022; H02J 2207/20; H02J 7/02; H02J 2310/20; H02H 1/06
USPC ............................................................ 307/64
See application file for complete search history.

(56) References Cited

U.S. PATENT DOCUMENTS

| | | | | |
|---|---|---|---|---|
| 6,201,371 | B1* | 3/2001 | Kawabe | H02J 9/062 320/121 |
| 2016/0276870 | A1* | 9/2016 | Olsen | H02J 9/061 |
| 2018/0331568 | A1* | 11/2018 | Toyoda | H02J 3/38 |
| 2019/0067987 | A1* | 2/2019 | Tsai | H02J 7/00 |

FOREIGN PATENT DOCUMENTS

CN 104953696 * 9/2015

* cited by examiner

*Primary Examiner* — Richard Tan
(74) *Attorney, Agent, or Firm* — Bacon & Thomas, PLLC

(57) ABSTRACT

A power supplying device comprising a battery, a charging circuit and a DC-AC conversion circuit is provided. The charging circuit is electrically coupled to an AC power source and configured to charge the battery. The DC-AC conversion circuit is electrically coupled to the battery and configured to supply an AC output. When the power supplying device is powered on, both of the charging circuit and the DC-AC conversion circuit are enabled.

28 Claims, 9 Drawing Sheets

POWER SUPPLYING DEVICE

BACKGROUND OF THE INVENTION

Field of the Invention

The present invention relates to the technical field of power supply, and more particularly, to a power supplying device.

Description of Related Art

Circuit breakers are designed to protect you, your family, your home and your office. If a circuit breaker trips, it means there was too much current flowing through that particular circuit breaker. For example, a 15 Amp circuit breaker will trip when more than 15 Amps of current are flowing through it.

Once a circuit breaker trips, the power outlets associated with it will be powered down. This means that the electrical devices associated with these power outlets will be inoperable. For example, when these electrical devices (such as laser printers) are performing an important task (such as printing ballots) at the same time, the electrical devices printing ballots may draw high current instantaneously, and may consequently cause the circuit breaker trips. When these electrical devices are inoperable, the important task will be delayed or even impossible to complete.

SUMMARY OF THE INVENTION

An object of the present invention is to provide a power supplying device, which can be electrically coupled between a circuit breaker and at least electrical device to prevent the circuit breaker from tripping.

To achieve the above object, the present invention provides a power supplying device. The power supplying device comprises a battery, a charging circuit and a DC-AC conversion circuit. The charging circuit is electrically coupled to an AC power source and configured to charge the battery. The DC-AC conversion circuit is electrically coupled to the battery and configured to supply an AC output. When the power supplying device is powered on, both of the charging circuit and the DC-AC conversion circuit are enabled.

To achieve the above object, the present invention provides a power supplying device. The power supplying device comprises a battery, a charging circuit, a DC-AC conversion circuit and a control circuit. The charging circuit is electrically coupled to an AC power source and configured to charge the battery. The DC-AC conversion circuit is electrically coupled to the battery and configured to supply an AC output. The control circuit is electrically coupled to the charging circuit and the DC-AC conversion circuit for controlling their operations. When the control circuit enters a predetermined mode, the control circuit enables both of the charging circuit and the DC-AC conversion circuit.

Since the electrical devices draw the current supplied by the battery, instead of directly drawing the current supplied by the circuit breaker, the circuit breaker can be prevented from tripping.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components, in other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
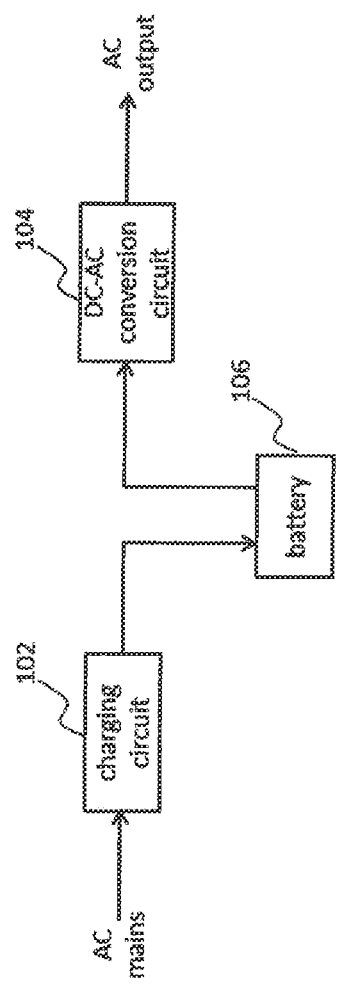
FIG. 1 shows a power supplying device according to an embodiment of the present invention.

FIG. 1 shows a power supplying device according to an embodiment of the present invention. Referring to FIG. 1, the power supplying device comprises a charging circuit 102, a DC-AC conversion circuit 104 and a battery 106. The charging circuit 102 is configured for electrically coupling an AC power source (e.g., AC mains) through a circuit breaker (e.g., a 15 Amp circuit breaker, not shown), and is configured to charge the battery 106. The charging circuit 102 can be a boost charging circuit, a buck charging circuit or a buck-boost charging circuit. For example, the input voltage, the input current, the output voltage and the output current of the charging circuit 102 can be 120V, 1 Amp, 300V and 0.4 Amp, respectively. For another example, the input voltage, the input current, the output voltage and the output current of the charging circuit 102 can be 120V, 1 Amp, 12V and 10 Amps, respectively.

The DC-AC conversion circuit 104 is electrically coupled to the battery 106 and configured to supply an AC output to at least an electrical device (not shown). The electrical device can be a resistive load, such as a laser printer. In this embodiment, the maximum output power of the power supplying device is greater than the maximum input power of the power supplying device. When the power supplying device is powered on, both of the charging circuit 102 and the DC-AC conversion circuit 104 are enabled.

Since the electrical device draws the current supplied by the battery 106, instead of directly drawing the current supplied by the circuit breaker, the circuit breaker can be prevented from tripping. In addition, in the case that the AC output is supplied to a plurality of laser printers, the charging circuit 102 will charge the battery 106 when the laser printers stop printing.

Figure 2:
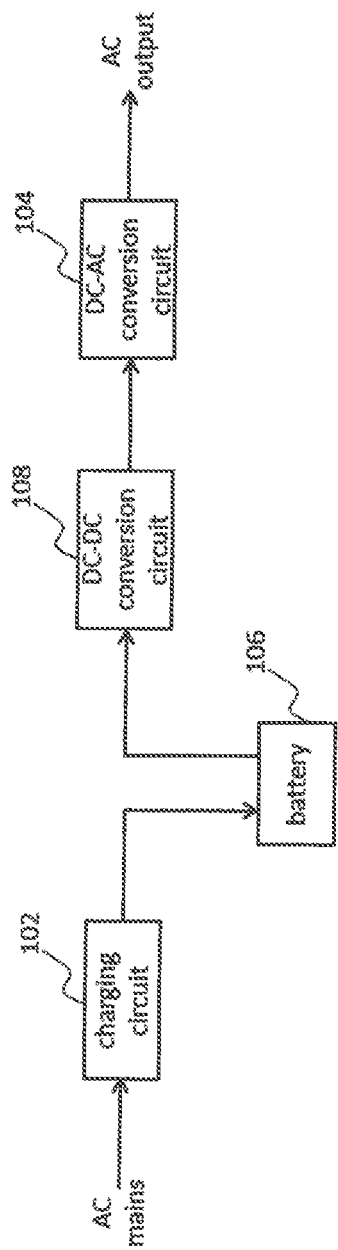
FIG. 2 shows a power supplying device according to another embodiment of the present invention.

FIG. 2 shows a power supplying device according to another embodiment of the present invention. Compared with the power supplying device shown in FIG. 1, the power supplying device shown FIG. 2 further adopts a DC-DC conversion circuit 108. The DC-DC conversion circuit 108 is electrically coupled between the battery 106 and the DC-AC conversion circuit 104. In this embodiment, the maximum output power of the power supplying device is greater than the maximum input power of the power supplying device. When the power supplying device is powered on, all of the charging circuit 102, the DC-AC conversion circuit 104 and the DC-DC conversion circuit 108 are enabled.

Figure 3:
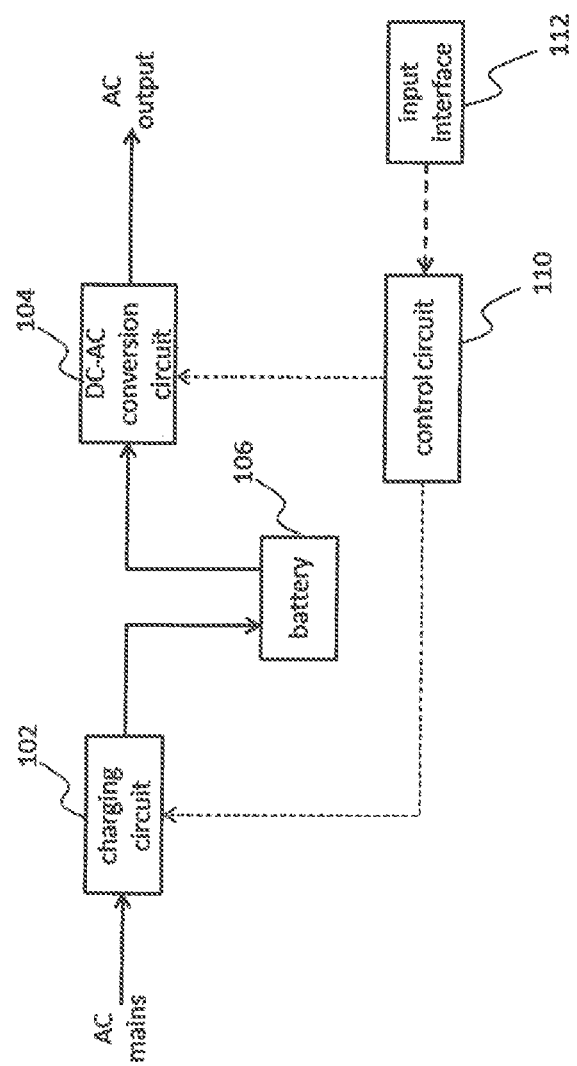
FIG. 3 shows a power supplying device according to still another embodiment of the present invention.

FIG. 3 shows a power supplying device according to still another embodiment of the present invention. Compared with the power supplying device shown in FIG. 1, the power supplying device shown in FIG. 3 further adopts a control circuit 110 and an input interface 112. The control circuit 110 is electrically coupled to the charging circuit 102 and the DC-AC conversion circuit 104 for controlling their operations. The input interface 112 is electrically coupled to the control circuit 110, and is configured for generating a control signal to the control circuit 110, thereby enabling the control circuit 110 to enter a predetermined mode. The input interface 112 comprises at least one of a button and a touch screen. Further, in this embodiment, the maximum output power of the power supplying device is greater than the maximum input power of the power supplying device. When the control circuit 110 enters the predetermined mode, the control circuit 110 enables both of the charging circuit 102 and the DC-AC conversion circuit 104.

Figure 4:
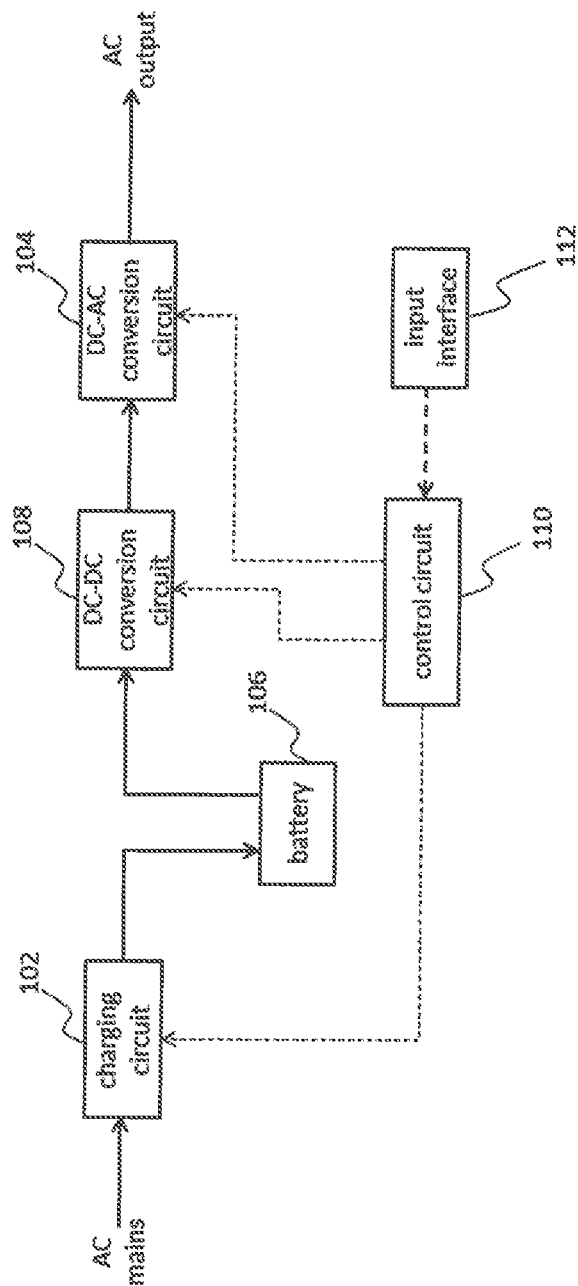
FIG. 4 shows a power supplying device according to still another embodiment of the present invention.

FIG. 4 shows a power supplying device according to still another embodiment of the present invention. Compared with the power supplying device shown in FIG. 2, the power supplying device shown in FIG. 4 further adopts a control circuit 110 and an input interface 112. In this embodiment, the maximum output power of the power supplying device is greater than the maximum input power of the power supplying device. When the control circuit 110 enters the predetermined mode, the control circuit 110 enables all of the charging circuit 102, the DC-AC conversion circuit 104 and the DC-DC conversion circuit 108.

Figure 5:
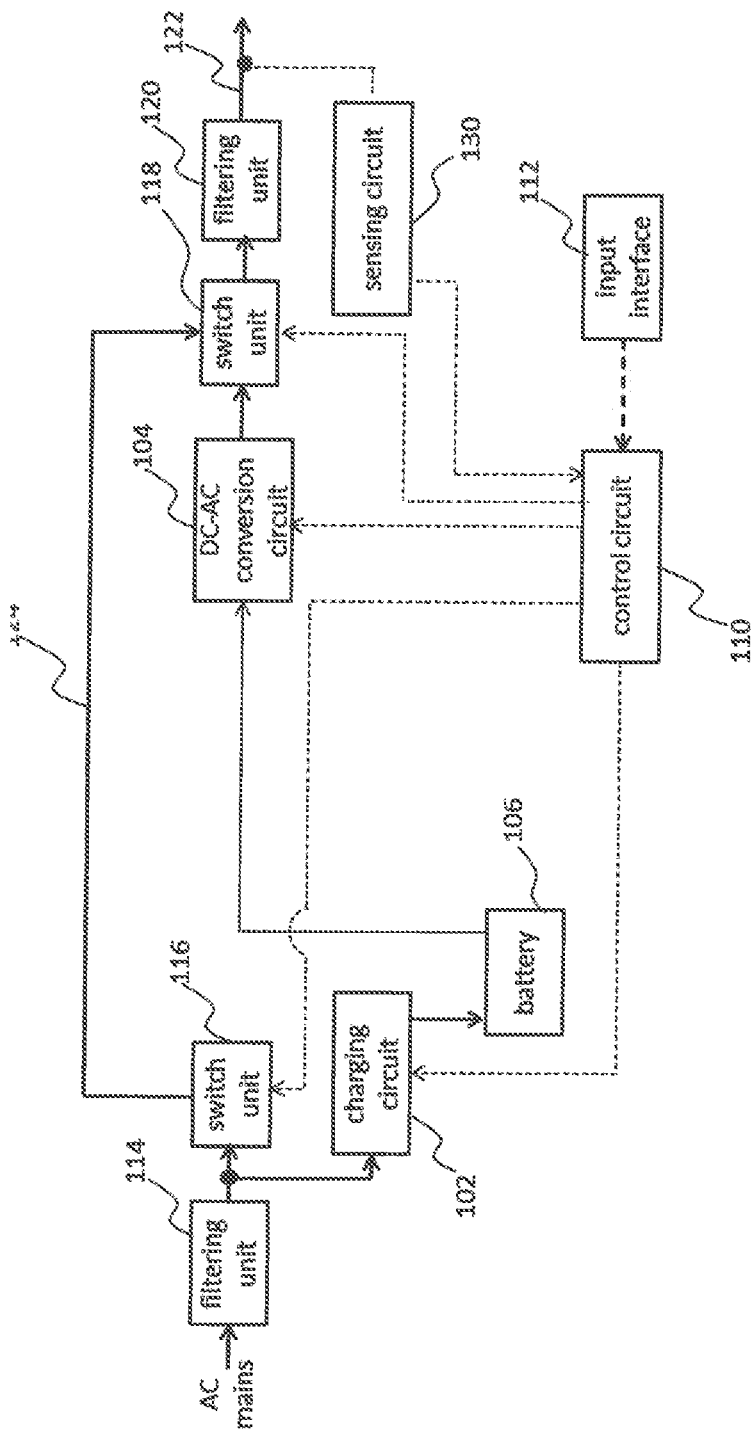
FIG. 5 shows an off-line uninterruptible power system comprising a power supplying device according to an embodiment of the present invention.

The power supplying device shown in FIG. 1 can be a part of an off-line uninterruptible power system or a line-interactive uninterruptible power system. This will be illustrated by FIGS. 5 and 7, respectively. FIG. 5 shows an off-line uninterruptible power system comprising a power supplying device according to an embodiment of the present invention.

Referring to FIG. 5, in this embodiment, the off-line uninterruptible power system comprises a filtering unit 114, a switch unit 116, a DC-AC conversion circuit 104, a switch unit 118, a filtering unit 120, a charging circuit 102, a battery 106, a control circuit 110 and an input interface 112.

The control circuit 110 is electrically coupled to the switch unit 116, the DC-AC conversion circuit 104, the switch unit 118 and the charging circuit 102, so as to control their operations. For example, the control circuit 110 is configured to control the operation of the switch unit 116, so as to determine whether to provide the output of the filtering unit 114 to the bypass path 124. For another example, the control circuit 130 is further configured to control the operation of the switch unit 118, so as to electrically couple the input terminal of the filter unit 120 to the output terminal of the DC-AC conversion circuit 104, or to electrically couple the input terminal of the filter unit 120 to the bypass path 124, so as to supply power through the output terminal 122 of the off-line uninterruptible power system.

In this embodiment, the charging circuit 102, the DC-AC conversion circuit 104 and the battery 106 constitute a power supplying device which performs the same function as the power supplying device shown in FIG. 1. More specifically, when the off-line uninterruptible: power system is powered on, the control circuit 110 enables both of the charging circuit 102 and the DC-AC conversion circuit 104, and controls the switch unit 118 to electrically couple the input terminal of the filter unit 120 to the output terminal of the DC-AC conversion circuit 104, so that the AC output of the DC-AC conversion circuit 104 is served as the output of the off-line uninterruptible power system.

Figure 7:
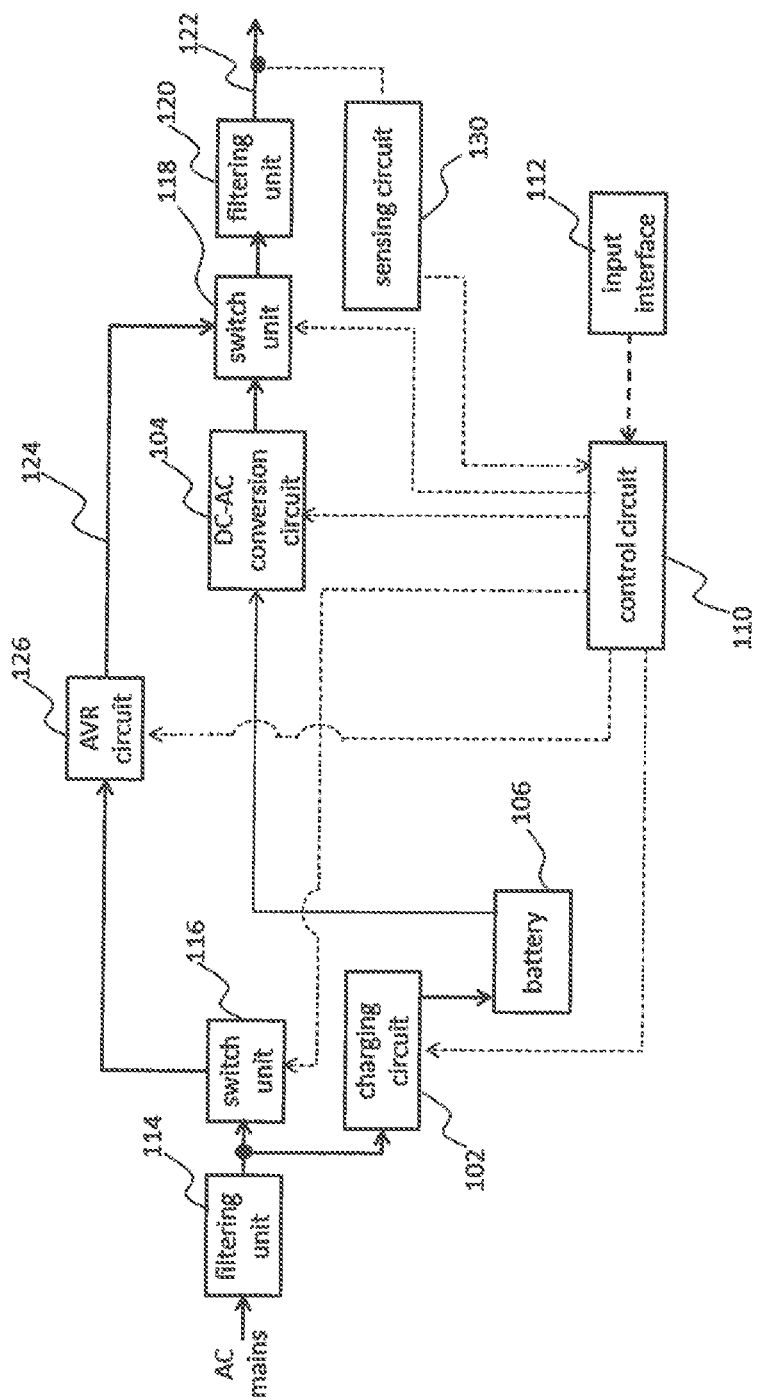
FIG. 7 shows a line-interactive uninterruptible power system comprising a power supplying device according to an embodiment of the present invention.

FIG. 7 shows a line-interactive uninterruptible power system comprising a power supplying device according to an embodiment of the present invention, Referring to FIG. 7, in this embodiment, the line-interactive uninterruptible power system comprises a filtering unit 114, a switch unit 116, a DC-AC conversion circuit 104, a switch unit 118, a filtering unit 120, a charging circuit 102, a battery 106, a control circuit 110, an input interface 112 and an AVR circuit (automatic voltage regulating circuit) 126.

The control circuit 110 is electrically coupled to the switch unit 116, the DC-AC conversion circuit 104, the switch unit 118, the charging circuit 102 and the AVR circuit 126, so as to control their operations. For example, the control circuit 110 is configured to control the operation of the switch unit 116, so as to determine whether to provide the output of the filtering unit 114 to the AVR circuit 126. For another example, the control circuit 130 is further configured to control the operation of the switch unit 118, so as to electrically couple the input terminal of the filter unit 120 to the output terminal of the DC-AC conversion circuit 104, or to electrically couple the input terminal of the filter unit 120 to the bypass path 124, so as to supply power through the output terminal 122 of the line-interactive uninterruptible power system.

In this embodiment, the charging circuit 102, the DC-AC conversion circuit 104 and the battery 106 constitute a power supplying device which performs the same function as the power supplying device shown in FIG. 1. More specifically, when the line-interactive uninterruptible power system is powered on, the control circuit 110 enables both of the charging circuit 102 and the DC-AC conversion circuit 104, disables the AVR circuit 126, and controls the switch unit 118 to electrically couple the input terminal of the filter unit 120 to the output terminal of the DC-AC conversion circuit 104, so that the AC output of the DC-AC conversion circuit 104 is served as the output of the line-interactive uninterruptible power system.

Figure 6:
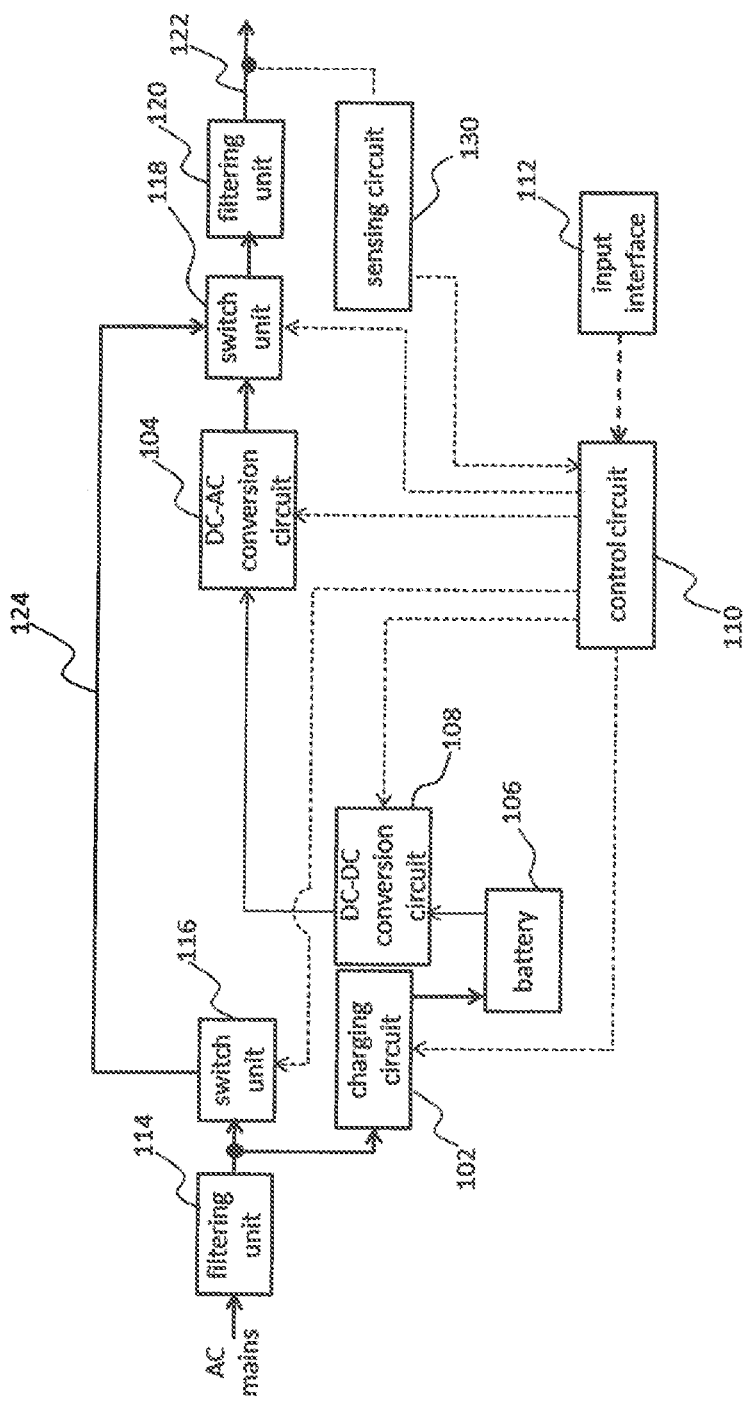
FIG. 6 shows an off-line uninterruptible power system comprising a power supplying device according to another embodiment of the present invention.

The power supplying device shown in FIG. 2 can be a part of an off-line uninterruptible power system, a line-interactive uninterruptible power system or an on-line uninterruptible power system. This will be illustrated by FIGS. 6, 8 and 9, respectively. FIG. 6 shows an off-line uninterruptible power system comprising a power supplying device according to another embodiment of the present invention. Referring to FIG. 6, in this embodiment, the off-line uninterruptible power system comprises a filtering unit 114, a switch unit 116, a DC-AC conversion circuit 104, a switch unit 118, a filtering unit 120, a charging circuit 102, a DC-DC conversion circuit 108, a battery 106, a control circuit 110 and an input interface 112.

In this embodiment, the charging circuit 102, the DC-AC conversion circuit 104, the battery 106 and the DC-DC conversion circuit 108 constitute a power supplying device which performs the same function as the power supplying device shown in FIG. 2. More specifically, when the off-line uninterruptible power system is powered on, the control circuit 110 enables all of the charging circuit 102, the DC-AC conversion circuit 104 and the DC-DC conversion circuit 108, and controls the switch unit 118 to electrically couple the input terminal of the filter unit 120 to the output terminal of the DC-AC conversion circuit 104, so that the AC output of the DC-AC conversion circuit 104 is served as the output of the off-line uninterruptible power system.

Figure 8:
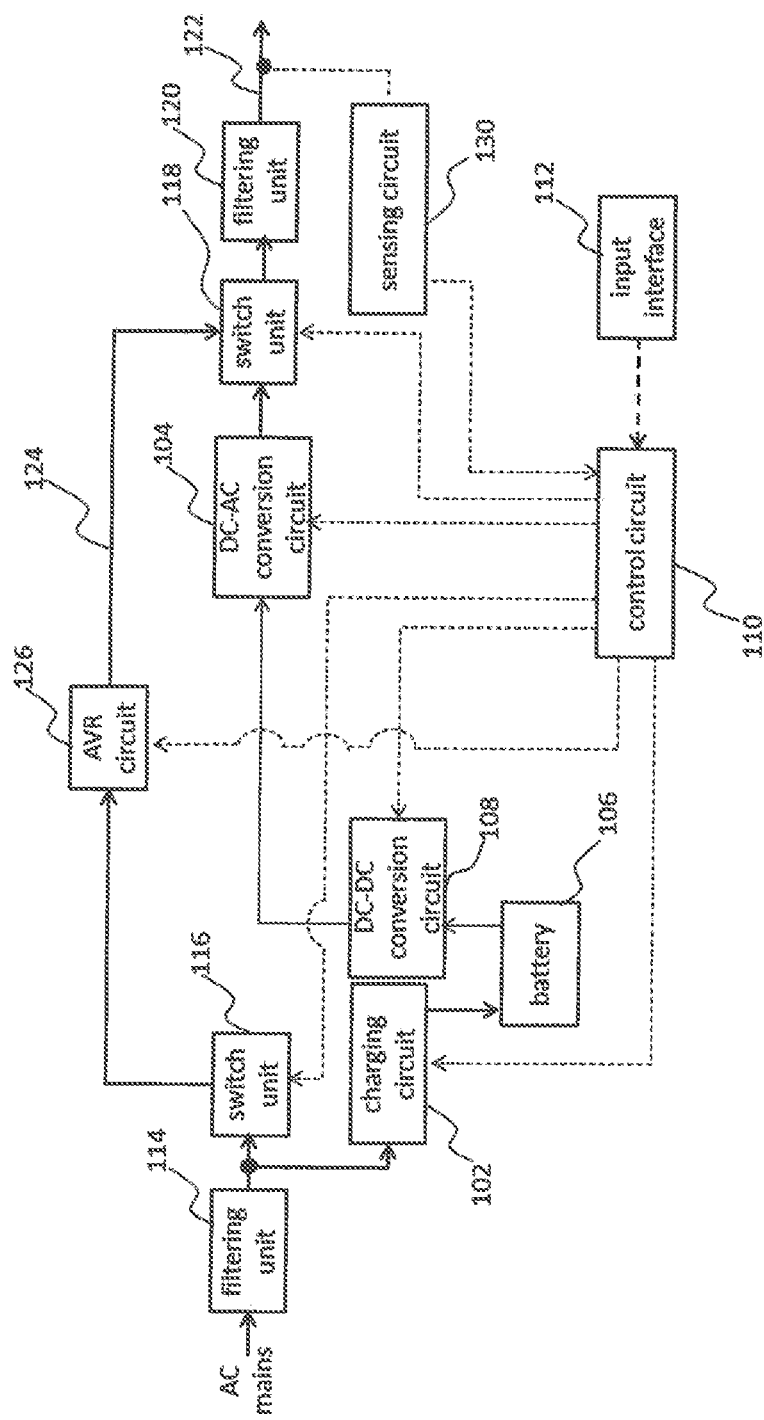
FIG. 8 shows a line-interactive uninterruptible power system comprising a power supplying device according to another embodiment of the present invention.

FIG. 8 shows a line-interactive uninterruptible power system comprising a power supplying device according to another embodiment of the present invention. Referring to FIG. 8, in this embodiment, the line-interactive uninterruptible power system comprises a filtering unit 114, a switch unit 116, a DC-AC conversion circuit 104, a switch unit 118, a filtering unit 120, a charging circuit 102, a DC-DC conversion circuit 108, a battery 106, a control circuit 110, an input interface 112 and an AVR circuit 126.

In this embodiment, the charging circuit 102, the DC-AC conversion circuit 104, the battery 106 and the DC-DC conversion circuit 108 constitute a power supplying device which performs the same function as the power supplying device shown in FIG. 2. More specifically, when the line-interactive uninterruptible power system is powered on, the control circuit 110 enables all of the charging circuit 102, the DC-AC conversion circuit 104 and the DC-DC conversion circuit 108, disables the AVR circuit 126, and controls the switch unit 118 to electrically couple the input terminal of the filter unit 120 to the output terminal of the DC-AC conversion circuit 104, so that the AC output of the DC-AC conversion circuit 104 is served as the output of the line-interactive uninterruptible power system.

Figure 9:
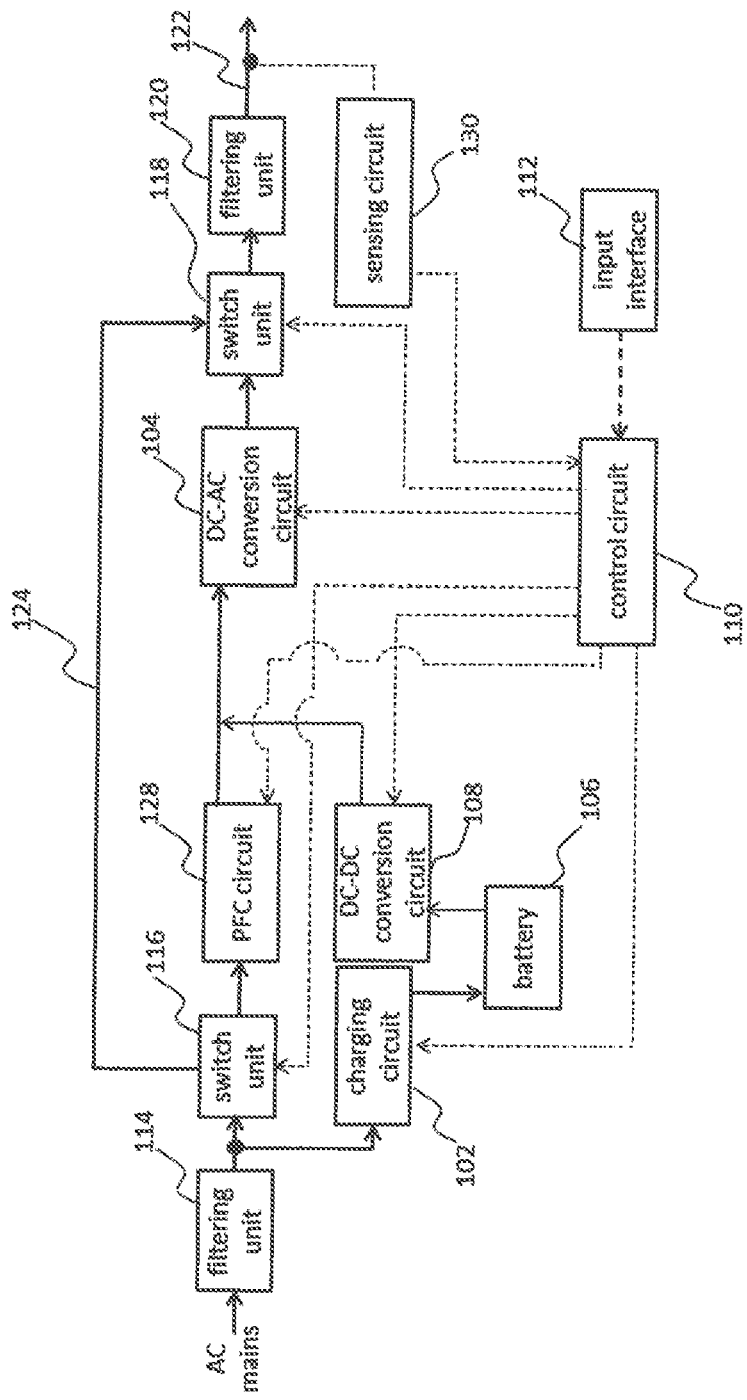
FIG. 9 shows an on-line uninterruptible power system comprising a power supplying device according to an embodiment of the present invention.

FIG. 9 shows an on-line uninterruptible power system comprising a power supplying device according to an embodiment of the present invention. Referring to FIG. 9, in this embodiment, the on-line uninterruptible power system comprises a filtering unit 114, a switch unit 116, a PFC circuit (power factor correction circuit) 128, a DC-AC conversion circuit 104, a switch unit 118, a filtering unit 120, a charging circuit 102, a DC-DC conversion circuit 108, a battery 106, a control circuit 110 and an input interface 112. In this embodiment, the charging circuit 102, the DC-AC conversion circuit 104, the battery 106 and the DC-DC conversion circuit 108 constitute a power supplying device which performs the same function as the power supplying device shown in FIG. 2. More specifically, when the on-line uninterruptible power system is powered on, the control circuit 110 enables all of the charging circuit 102, the DC-AC conversion circuit 104 and the DC-DC conversion circuit 108, disables the PFC circuit 128, and controls the switch unit 118 to electrically couple the input terminal of the filter unit 120 to the output terminal of the DC-AC conversion circuit 104, so that the AC output of the DC-AC conversion circuit 104 is served as the output of the on-line uninterruptible power system.

The power supplying device shown in FIG. 3 can be a part of an off-line uninterruptible power system or a line-interactive uninterruptible power system. This will also be illustrated by FIGS. 5 and 7, respectively. Referring to FIG. 5, in this embodiment, the charging circuit 102, the DC-AC conversion circuit 104, the battery 106, the control circuit 110 and the input interface 122 constitute a power supplying device which performs the same function as the power supplying device shown in FIG. 3. More specifically, when the control circuit 110 enters the predetermined mode, the control circuit enables both of the charging circuit 102 and the DC-AC conversion circuit 104, and controls the switch unit 118 to electrically couple the input terminal of the filter unit 120 to the output terminal of the DC-AC conversion circuit 104, so that the AC output of the DC-AC conversion circuit 104 is served as the output of the off-line uninterruptible power system.

Referring to FIG. 5 again, in another embodiment, the control circuit 110 is configured to determine whether to enter the predetermined mode according to a sensed data of a sensing circuit 130 configured for sensing the output of the off-line uninterruptible power system, and the control circuit 110 determines to enter the predetermined mode when the sensed data indicating that the output voltage and the output current are detected at the same time (This means that the electrical devices electrically coupled to the output terminal 122 are resistive loads). However, this manner of determining whether to enter the predetermined mode is not intended to limit the present invention. For example, in still another embodiment, the control circuit 110 determines to enter the predetermined mode when the sensed data indicating that a power factor essentially equals to 1 (This also means that the electrical devices electrically coupled to the output terminal 122 are resistive loads). In addition, it is worth mentioning that the sensing circuit 130 and the input interface 112 can be adopted according to actual design requirements.

Referring to FIG. 7, in this embodiment, the charging circuit 102, the DC-AC conversion circuit 104, the battery 106, the control circuit 110 and the input interface 122 constitute a power supplying device which performs the same function as the power supplying device shown in FIG. 3. More specifically, when the control circuit 110 enters the predetermined mode, the control circuit enables both of the charging circuit 102 and the DC-AC conversion circuit 104, disables the AVR circuit 126, and controls the switch unit 118 to electrically couple the input terminal of the filter unit 120 to the output terminal of the DC-AC conversion circuit 104, so that the AC output of the DC-AC conversion circuit 104 is served as the output of the line-interactive uninterruptible power system.

Referring to FIG. 7 again, in another embodiment, the control circuit 110 is configured to determine whether to enter the predetermined mode according to a sensed data of a sensing circuit 130 configured for sensing the output of the line-interactive uninterruptible power system, and the control circuit 110 determines to enter the predetermined mode when the sensed data indicating that the output voltage and the output current are detected at the same time. Similarly, in still another embodiment, the control circuit 110 determines to enter the predetermined mode when the sensed data indicating that a power factor essentially equals to 1. In addition, it is worth mentioning that the sensing circuit 130 and the input interface 112 can be adopted according to actual design requirements.

The power supplying device shown in FIG. 4 can be a part of an off-line uninterruptible power system, a line-interactive uninterruptible power system or an on-line uninterruptible power system. This will also be illustrated by FIGS. 6, 8 and 9, respectively. Referring to FIG. 6, in this embodiment, the charging circuit 102, the DC-AC conversion circuit 104, the battery 106, the control circuit 110, the input interface 122 and the DC-DC conversion circuit 108 constitute a power supplying device which performs the same function as the power supplying device shown in FIG. 4. More specifically, when the control circuit 110 enters the predetermined mode, the control circuit enables all of the charging circuit 102, the DC-AC conversion circuit 104 and the DC-DC conversion circuit 108, and controls the switch unit 118 to electrically couple the input terminal of the filter unit 120 to the output terminal of the DC-AC conversion circuit 104, so that the AC output of the DC-AC conversion circuit 104 is served as the output of the off-line uninterruptible power system.

Referring to FIG. 6 again, in another embodiment, the control circuit 110 is configured to determine whether to enter the predetermined mode according to a sensed data of a sensing circuit 130 configured for sensing the output of the uninterruptible power system, and the control circuit 110 determines to enter the predetermined mode when the sensed data indicating that the output voltage and the output current are detected at the same time. Similarly, in still another embodiment, the control circuit 110 determines to enter the predetermined mode when the sensed data indicating that a power factor essentially equals to 1. In addition, it is worth mentioning that the sensing circuit 130 and the input interface 112 can be adopted according to actual design requirements.

Referring to FIG. 8, in this embodiment, the charging circuit 102, the DC-AC conversion circuit 104, the battery 106, the control circuit 110, the input interface 122 and the DC-DC conversion circuit 108 constitute a power supplying device which performs the same function as the power supplying device shown in FIG. 4. More specifically, when the control circuit 110 enters the predetermined mode, the control circuit enables all of the charging circuit 102, the DC-AC conversion circuit 104 and the DC-DC conversion circuit 108, disables the AVR circuit 126, and controls the switch unit 118 to electrically couple the input terminal of the filter unit 120 to the output terminal of the DC-AC conversion circuit 104, so that the AC output of the DC-AC conversion circuit 104 is sewed as the output of the line-interactive uninterruptible power system.

Referring to FIG. 8 again, in another embodiment, the control circuit 110 is configured to determine whether to enter the predetermined mode according to a sensed data of a sensing circuit 130 configured for sensing the output of the line-interactive uninterruptible power system, and the control circuit 110 determines to enter the predetermined mode when the sensed data indicating that the output voltage and the output current are detected at the same time. Similarly, in still another embodiment, the control circuit 110 determines to enter the predetermined mode when the sensed data indicating that a power factor essentially equals to 1. In addition, it is worth mentioning that the sensing circuit 130 and the input interface 112 can be adopted according to actual design requirements.

Referring to FIG. 9, in this embodiment, the charging circuit 102, the DC-AC conversion circuit 104, the battery 106, the control circuit 110, the input interface 122 and the DC-DC conversion circuit 108 constitute a power supplying device which performs the same function as the power supplying device shown in FIG. 4. More specifically, when the control circuit 110 enters the predetermined mode, the control circuit enables all of the charging circuit 102, the DC-AC conversion circuit 104 and the DC-DC conversion circuit 108, disables the PFC circuit 128, and controls the switch unit 118 to electrically couple the input terminal of the filter unit 120 to the output terminal of the DC-AC conversion circuit 104, so that the AC output of the DC-AC conversion circuit 104 is sewed as the output of the on-line uninterruptible power system.

Referring to FIG. 9 again, in another embodiment, the control circuit 110 is configured to determine whether to enter the predetermined mode according to a sensed data of a sensing circuit 130 configured for sensing the output of the on-line uninterruptible power system, and the control circuit 110 determines to enter the predetermined mode when the sensed data indicating that the output voltage and the output current are detected at the same time. Similarly, in still another embodiment, the control circuit 110 determines to enter the predetermined mode when the sensed data indicating that a power factor essentially equals to 1. In addition, it is worth mentioning that the sensing circuit 130 and the input interface 112 can be adopted according to actual design requirements.

In summary, since a power supplying device of the present invention or an uninterruptible power system comprising a power supplying device of the present invention can be electrically coupled between a circuit breaker and at least an electrical device, the electrical devices draw the current supplied by the battery; instead of directly drawing the current supplied by the circuit breaker. Therefore, the circuit breaker can be prevented from tripping.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supplying device, comprising:
  a battery;
  a charging circuit, electrically coupled to an AC power source and configured to charge the battery;
  a DC-AC conversion circuit, electrically coupled to the battery and configured to supply an AC output; and
  a control circuit, electrically coupled to the charging circuit and the DC-AC conversion circuit for controlling their operations,
  wherein the power supplying device is a part of a line-interactive uninterruptible power system,
  wherein when the control circuit enters a predetermined mode, the control circuit enables both of the charging circuit and the DC-AC conversion circuit, and disables an automatic voltage regulating circuit of the line-interactive uninterruptible power system, and the AC output serves as an output of the line-interactive uninterruptible power system,
  wherein the control circuit is further configured to determine whether to enter the predetermined mode according to a sensed data of a sensing circuit configured for sensing the output of the line-interactive uninterruptible power system, and the control circuit determines to enter the predetermined mode when the sensed data indicating that an output voltage and an output current are detected at the same time.

2. The power supplying device as claimed in claim 1, wherein the maximum output power of the power supplying device is greater than the maximum input power of the power supplying device.

3. The power supplying device as claimed in claim 1, further comprising a DC-DC conversion circuit electrically coupled between the battery and the DC-AC conversion circuit, wherein when the control circuit enters the predetermined mode, the control circuit further enables the DC-DC conversion circuit.

4. The power supplying device as claimed in claim 3, further comprising an input interface for generating a control signal to the control circuit, thereby enabling the control circuit to enter the predetermined mode.

5. The power supplying device as claimed in claim 4, wherein the input interface comprises at least one of a button and a touch screen.

6. The power supplying device as claimed in claim 1, further comprising an input interface for generating a control signal to the control circuit, thereby enabling the control circuit to enter the predetermined mode.

7. The power supplying device as claimed in claim 6, wherein the input interface comprises at least one of a button and a touch screen.

8. A power supplying device, comprising:
a battery;
a charging circuit, electrically coupled to an AC power source and configured to charge the battery;
a DC-AC conversion circuit, electrically coupled to the battery and configured to supply an AC output, and
a DC-DC conversion circuit electrically coupled between the battery and the DC-AC conversion circuit,
wherein the power supplying device is a part of an on-line uninterruptible power system, and
wherein when the on-line uninterruptible power system is powered on, all of the charging circuit, the DC-AC conversion circuit and the DC-DC conversion circuit are enabled, a power factor correction circuit of the on-line uninterruptible power system is disabled, and the AC output serves as an output of the on-line uninterruptible power system.

9. The power supplying device as claimed in claim 8, wherein the maximum output power of the power supplying device is greater than the maximum input power of the power supplying device.

10. The power supplying device as claimed in claim 8, wherein the AC output is supplied to a resistive load.

11. The power supplying device as claimed in claim 10, wherein the resistive load comprises a laser printer.

12. A power supplying device, comprising:
a battery;
a charging circuit, electrically coupled to an AC power source and configured to charge the battery;
a DC-AC conversion circuit, electrically coupled to the battery and configured to supply an AC output;
a control circuit, electrically coupled to the charging circuit and the DC-AC conversion circuit for controlling their operations; and
a DC-DC conversion circuit electrically coupled between the battery and the DC-AC conversion circuit,
wherein the power supplying device is a part of an on-line uninterruptible power system, and
wherein when the control circuit enters a predetermined mode, the control circuit enables all of the charging circuit, the DC-AC conversion circuit and the DC-DC conversion circuit, and disables a power factor correction circuit of the on-line uninterruptible power system, and the AC output serves as an output of the on-line uninterruptible power system.

13. The power supplying device as claimed in claim 12, wherein the maximum output power of the power supplying device is greater than the maximum input power of the power supplying device.

14. The power supplying device as claimed in claim 12, further comprising an input interface for generating a control signal to the control circuit, thereby enabling the control circuit to enter the predetermined mode.

15. The power supplying device as claimed in claim 14, wherein the input interface comprises at least one of a button and a touch screen.

16. The power supplying device as claimed in claim 12, wherein the control circuit is further configured to determine whether to enter the predetermined mode according to a sensed data of a sensing circuit configured for sensing the output of the on-line uninterruptible power system, and the control circuit determines to enter the predetermined mode when the sensed data indicating that an output voltage and an output current are detected at the same time.

17. The power supplying device as claimed in claim 12, wherein the control circuit is further configured to determine whether to enter the predetermined mode according to a sensed data of a sensing circuit configured for sensing the output of the uninterruptible power system, and the control circuit determines to enter the predetermined mode when the sensed data indicating that a power factor essentially equals to 1.

18. A power supplying device, comprising:
a battery;
a charging circuit, electrically coupled to an AC power source and configured to charge the battery;
a DC-AC conversion circuit, electrically coupled to the battery and configured to supply an AC output; and
a control circuit, electrically coupled to the charging circuit and the DC-AC conversion circuit for controlling their operations,
wherein the power supplying device is a part of an off-line uninterruptible power system,
wherein when the control circuit enters a predetermined mode, the control circuit enables both of the charging circuit and the DC-AC conversion circuit, and the AC output serves as an output of the off-line uninterruptible power system, and
wherein the control circuit is further configured to determine whether to enter the predetermined mode according to a sensed data of a sensing circuit configured for sensing an output of the off-line uninterruptible power system, and the control circuit determines to enter the predetermined mode when the sensed data indicating that an output voltage and an output current are detected at the same time.

19. The power supplying device as claimed in claim 18, further comprising a DC-DC conversion circuit electrically coupled between the battery and the DC-AC conversion circuit, wherein when the control circuit enters the predetermined mode, the control circuit further enables the DC-DC conversion circuit.

20. A power supplying device, comprising:
- a battery;
- a charging circuit, electrically coupled to an AC power source and configured to charge the battery;
- a DC-AC conversion circuit, electrically coupled to the battery and configured to supply an AC output; and
- a control circuit, electrically coupled to the charging circuit and the DC-AC conversion circuit for controlling their operations, wherein the power supplying device is a part of an off-line uninterruptible power system, wherein when the control circuit enters a predetermined mode, the control circuit enables both of the charging circuit and the DC-AC conversion circuit, and the AC output serves as an output of the off-line uninterruptible power system, and wherein the control circuit is further configured to determine whether to enter the predetermined mode according to a sensed data of a sensing circuit configured for sensing an output of the off-line uninterruptible power system, and the control circuit determines to enter the predetermined mode when the sensed data indicating that a power factor essentially equals to 1.

21. The power supplying device as claimed in claim 20, further comprising a DC-DC conversion circuit electrically coupled between the battery and the DC-AC conversion circuit, wherein when the control circuit enters the predetermined mode, the control circuit further enables the DC-DC conversion circuit.

22. A power supplying device, comprising:
- a battery;
- a charging circuit, electrically coupled to an AC power source and configured to charge the battery;
- a DC-AC conversion circuit, electrically coupled to the battery and configured to supply an AC output; and
- a control circuit, electrically coupled to the charging circuit and the DC-AC conversion circuit for controlling their operations, wherein the power supplying device is a part of a line-interactive uninterruptible power system, wherein when the control circuit enters a predetermined mode, the control circuit enables both of the charging circuit and the DC-AC conversion circuit, and disables an automatic voltage regulating circuit of the line-interactive uninterruptible power system, and the AC output serves as an output of the line-interactive uninterruptible power system, wherein the control circuit is further configured to determine whether to enter the predetermined mode according to a sensed data of a sensing circuit configured for sensing the output of the line-interactive uninterruptible power system, and the control circuit determines to enter the predetermined mode when the sensed data indicating that a power factor essentially equals to 1.

23. The power supplying device as claimed in claim 22, wherein the maximum output power of the power supplying device is greater than the maximum input power of the power supplying device.

24. The power supplying device as claimed in claim 22, further comprising a DC-DC conversion circuit electrically coupled between the battery and the DC-AC conversion circuit, wherein when the control circuit enters the predetermined mode, the control circuit further enables the DC-DC conversion circuit.

25. The power supplying device as claimed in claim 24, further comprising an input interface for generating a control signal to the control circuit, thereby enabling the control circuit to enter the predetermined mode.

26. The power supplying device as claimed in claim 25, wherein the input interface comprises at least one of a button and a touch screen.

27. The power supplying device as claimed in claim 22, further comprising an input interface for generating a control signal to the control circuit, thereby enabling the control circuit to enter the predetermined mode.

28. The power supplying device as claimed in claim 27, wherein the input interface comprises at least one of a button and a touch screen.

* * * * *